(12) United States Patent
Baccarin et al.

(10) Patent No.: US 9,370,055 B2
(45) Date of Patent: Jun. 14, 2016

(54) DRIVER DEVICE FOR LIGHT SOURCES

(71) Applicant: Automotive Lighting Italia S.p.A. a Socio Unico, Turin (IT)

(72) Inventors: Davide Baccarin, Turin (IT); Alberto Guiotto, Turin (IT)

(73) Assignee: AUTOMOTIVE LIGHTING ITALIA S.P.A. A SOCIO UNICO, Turin (IT)

( * ) Notice: Subject to any disclaimer, the term of this patent is extended or adjusted under 35 U.S.C. 154(b) by 0 days.

(21) Appl. No.: 14/718,133

(22) Filed: May 21, 2015

(65) Prior Publication Data

US 2015/0382412 A1  Dec. 31, 2015

(30) Foreign Application Priority Data

May 23, 2014  (IT) .............................. PD2014A0129

(51) Int. Cl.
   *H05B 37/02* (2006.01)
   *H05B 33/08* (2006.01)

(52) U.S. Cl.
   CPC .......... *H05B 33/0809* (2013.01); *H05B 33/089* (2013.01); *H05B 33/0845* (2013.01)

(58) Field of Classification Search
   CPC .......................... H05B 33/089; H05B 33/0809
   USPC ............................................ 315/77, 291, 294
   See application file for complete search history.

(56) References Cited

U.S. PATENT DOCUMENTS

| | | | | |
|---|---|---|---|---|
| 2008/0231203 A1* | 9/2008 | Budde | ................ | H05B 37/0263 315/186 |
| 2014/0327364 A1* | 11/2014 | Bischof | ............. | H05B 33/0863 315/158 |
| 2015/0294603 A1* | 10/2015 | Braunstein | .............. | G09F 13/22 315/86 |

FOREIGN PATENT DOCUMENTS

| | | |
|---|---|---|
| EP | 1981313 A1 | 10/2008 |
| EP | 2178130 A1 | 4/2010 |

OTHER PUBLICATIONS

Search Report dated Jan. 14, 2015 from the Italian Patent Office issued by the European Patent Office in Italian Application No. PD20140129.

* cited by examiner

*Primary Examiner* — Don Le
(74) *Attorney, Agent, or Firm* — Howard & Howard Attorneys PLLC

(57) ABSTRACT

A driver device of a plurality of light sources, in particular LEDs, includes a multi-channel current control module (20) which sets a power supply current on a respective output channel connected to at least one light source (12). At least one static configuration register (54) is connected to said current control module in which a static driving configuration corresponding to the value of the power supply current which the multi-channel current control module must set on each output channel when the driver device is in a stand alone operating mode, is pre-loaded as well as at least one dynamic configuration register (56) that acts to load a dynamic driving configuration received from a digital transmission data bus connected to an electronic control unit.

10 Claims, 3 Drawing Sheets

DRIVER DEVICE FOR LIGHT SOURCES

CROSS-REFERENCE TO RELATED APPLICATIONS

The present application claims priority to and all the benefits of Italian Patent Application No. PD2014A000129, filed on May 23, 2014, which is hereby expressly incorporated herein by reference in its entirety.

BACKGROUND OF THE INVENTION

1. Field of the Invention

The present invention relates to a driver device for light sources, in particular LEDs, and a vehicle light provided with such driver device.

2. Brief Description of the Related Art

Devices for driving LED sources, also known as LED drivers, typically include a multichannel current controller having a plurality of output channels to each of which at least one LED is connected and able to set a constant current on each of said channels for the powering of the LEDs. Some driver devices are suitable for statically driving the light sources, switching them on or switching them off all at the same time. Other driver devices are designed to achieve dynamic lighting effects, such as a progressive switching on of the LEDs of an indicator light of a vehicle, turning on or off the LEDs in a sequential manner. Depending on whether the lighting effect required is static or dynamic, a corresponding type of driver device is used.

SUMMARY OF THE INVENTION

The purpose of the present invention is to propose a driver device capable of driving light sources both statically and dynamically, depending on the light effect required. This purpose is achieved by a driver device for a plurality of light sources, in particular LEDs, wherein the driver device includes a multichannel current control module having a plurality of output channels. Each of the output channels is connected to at least one light source. The multichannel current control module is suitable to set a power supply current on each of the output channels. At least one static configuration register is operatively connected to the current control module. A static driving configuration is preloaded in the static configuration register corresponding to the power supply value which the multichannel current control module must set on each output channel when the driver device is in the stand alone operating mode. At least one dynamic configuration register is operatively connected to the multichannel control module. The dynamic configuration register is operable for loading a dynamic driving configuration received from a digital data transmission bus connected to an electronic control unit. The dynamic driving configuration corresponding to the power supply current value which the multichannel control module must set on each output channel when the driver device is in the bus controlled operating mode. A first configuration selection member is operable to transmit to the multichannel current control module the static driving configuration or dynamic driving configuration according to a selection signal indicating the operating module of the driver device.

BRIEF DESCRIPTION OF THE DRAWINGS

The characteristics and advantages of the device according to the invention will, in any case, be evident from the description given below of its preferred embodiments, made by way of a non-limiting example with reference to the appended drawings, wherein.

DETAILED DESCRIPTION OF THE INVENTION

Figure 1:
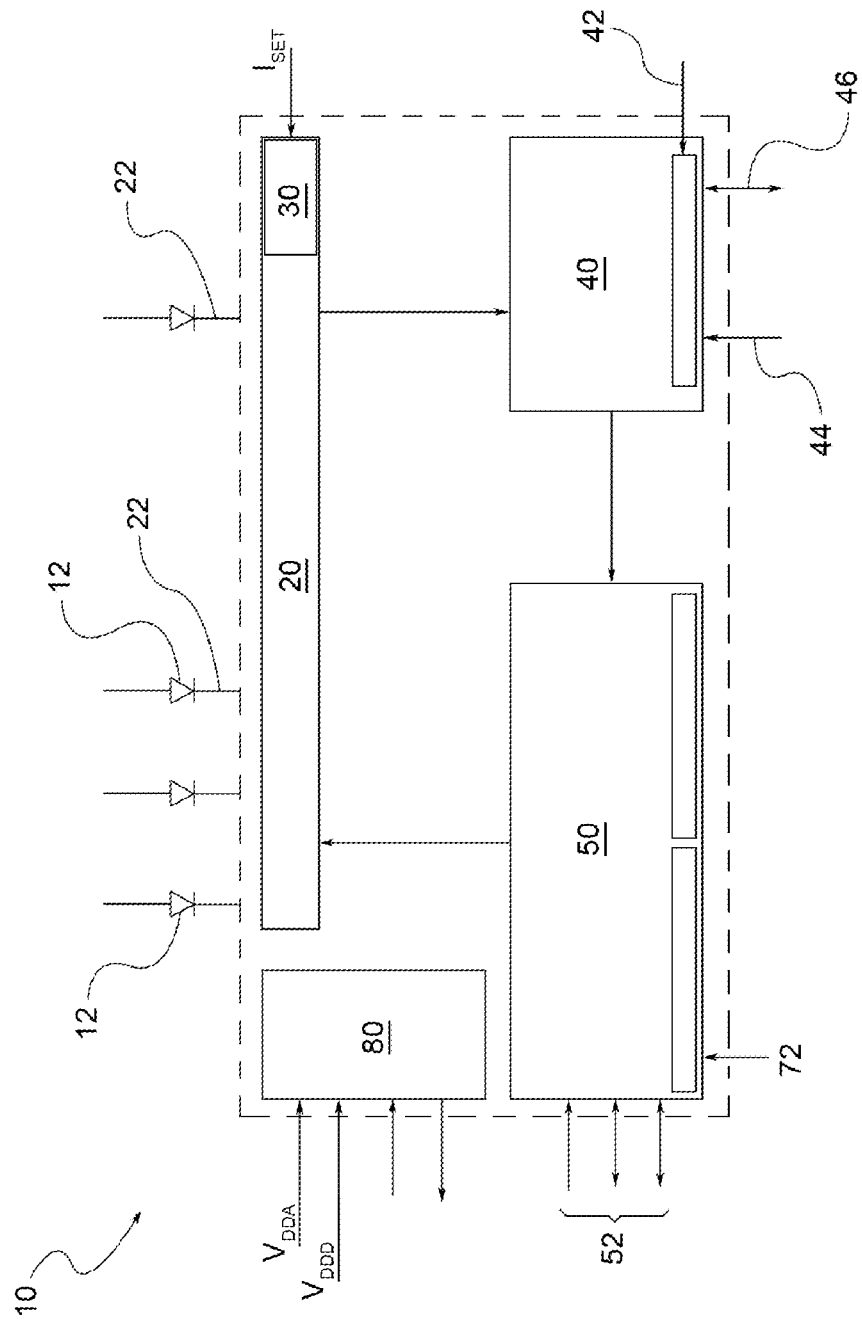
FIG. 1 is a block diagram of the driver device according to the invention.

FIG. 1 is a block diagram of a driver device 10 of a plurality of light sources 12. In the continuation of the description, reference will be made to LEDs as the preferred example of light sources, without limiting the scope of the present invention.

The driver device 10 includes a multichannel current control module 20, a setting module of the overall current 30, a diagnostic module 40, a control and configuration unit 50, and a control module of the internal supply voltage 80.

The multichannel current control module 20 comprises a plurality of current regulators, each of which is associated with a respective output channel 22, for example, sixteen output channels, each connected to a terminal suitable to be connected to at least one LED 12. For example, each output channel 22 is connected to a plurality of LEDs 12 interconnected by any serial and/or parallel and/or matrix configuration. The multichannel current control module 20 is suitable to set a power supply current on each of said output channels 22.

In one embodiment, the current control module 20 comprises switches 24, for example MOS transistors, each of which is associated with a respective output channel 22 of the lighting device and is responsible for regulating the current of each channel to the value set by the setting module of the overall current 30.

Each output channel 22 can be enabled or disabled. In the disabled channel, the circulating current is zero and no diagnostics are provided for.

Figure 2:
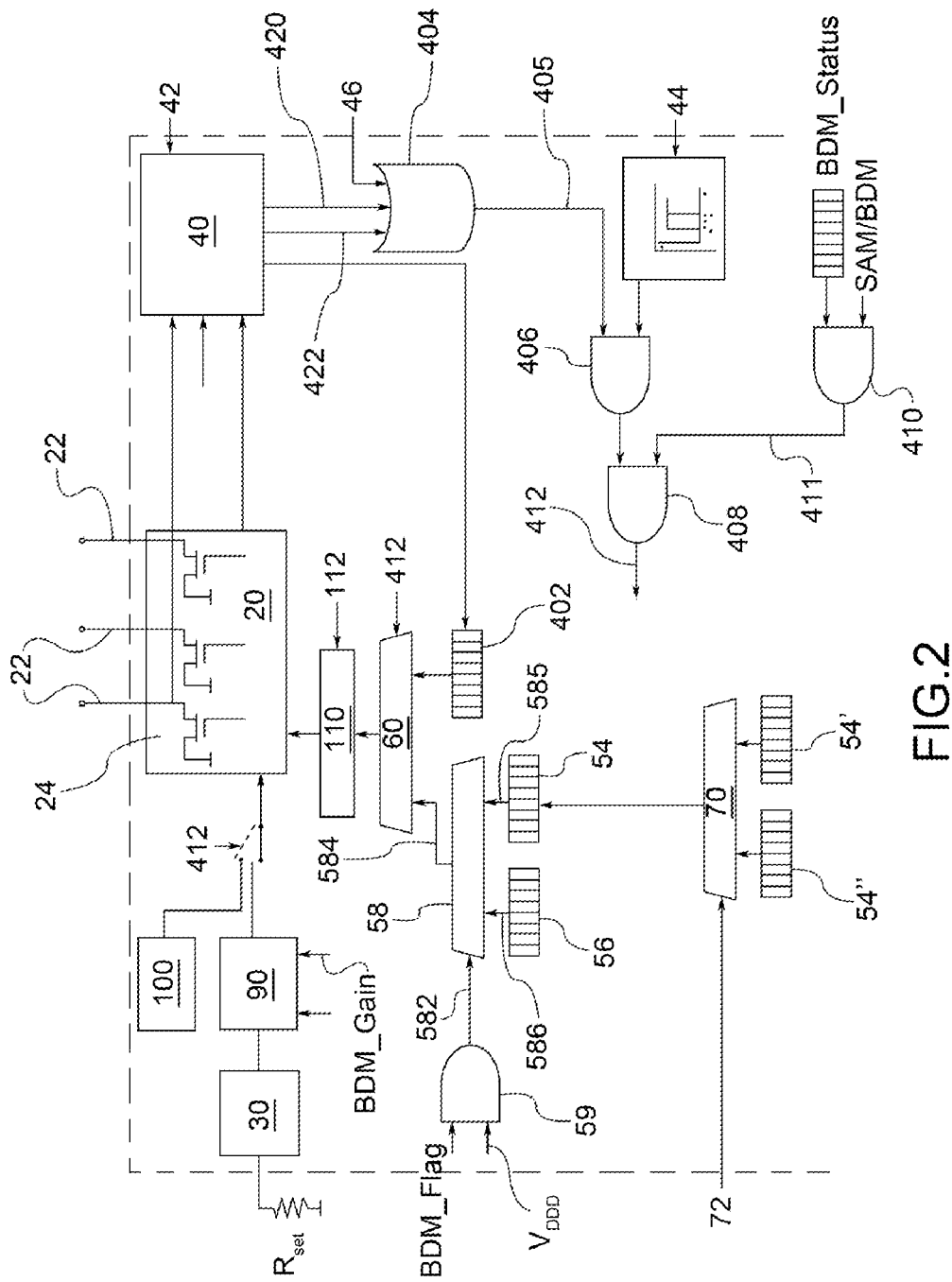
FIG. 2 is a more detailed block diagram of the driver device according to the invention.
Figure 3:
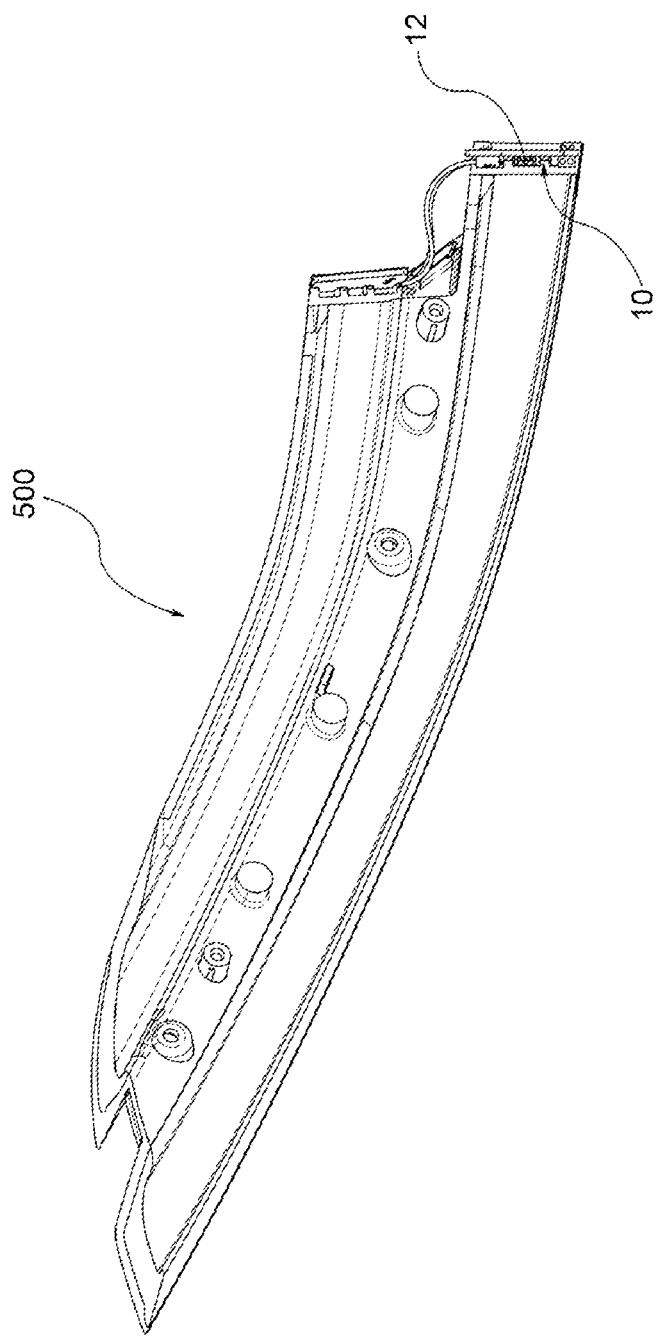
FIG. 3 is a representative perspective view of a vehicle light including the driver device for a plurality of light sources of the present invention.

The value of the power supply current of each channel connected to at least one LED is determined by the setting module of the overall current 30, which for example makes use of an external resistor RSET (as shown in FIG. 2) to obtain a reference current ISET. The setting module of the overall current 30 thus provides an indication to the multichannel current control module 20 of the value of current to make circulate on each output channel 22.

The diagnostic module 40 is operable to detect a short-circuit or open circuit fault on the output channels 22 of the multichannel current control module 20 and, in the presence of a fault, to report a fault state to the control and configuration unit 50. In addition, the diagnostic module 40 receives a threshold signal 42 which determines the open circuit and short circuit fault conditions, an enabling signal 44, which enables the diagnostic module when the power supply voltage of the LED exceeds a certain threshold, and exchanges an external diagnostic signal 46 with other driver devices.

The control and configuration unit 50, as will be explained below in greater detail, determines the configuration of the driver device and controls the multichannel current control module 20. In particular, the control and configuration unit 50 is able to operate the driver device both in a "stand-alone mode" and in an operating mode controlled by an external electronic control unit by use of a digital transmission data bus ("bus driven mode").

To such purpose, the control and configuration unit 50 is operable to exchange data and control signals 52, for example, the clock signal through the transmission data bus.

The control module of the power supply voltage 80 is operable to adjust both the analogue supply voltage VDDA supplying the analogue portion of the driver device, in particular the multichannel current control module 20, and the digital supply voltage VDDD, which supplies the digital part of the driver device, in particular the control and configuration unit 50.

The analogue supply voltage VDDA for example, comes directly from the power supply system which powers the analogue part of the driver device, in particular the current generator and has a value generally comprised between 7 and 18 V. The digital supply voltage VDDD is a signal which has a maximum of 7 V.

Turning now to the diagram in FIG. 2, which shows the architecture of the driver device according to the invention in greater detail, the control and configuration unit 50 includes at least one static configuration register 54, operatively connected to the multichannel current control module 20, and at least one dynamic configuration register 56 also operatively connected to the multichannel current control module 20. In the static configuration register 54 a static driver configuration is pre-loaded corresponding to the power supply current value which the multi-channel current control module 20 must set for each output channel 22 when the driver device is in the stand-alone operating mode.

For example, in one embodiment, in the static configuration register 54 a static driver configuration is pre-loaded corresponding to a binary state, in which for example the binary value "0" is associated with the "off" state and the binary value "1" is associated with the "on" state, associated with each current controller of the multi-channel current control module 20, when the driver device is in the stand-alone operating mode.

The dynamic configuration register 56 loads a dynamic driving configuration received from the digital transmission data bus, said dynamic driving configuration corresponding to the power supply current value which the multichannel current control module 20 must set for each output channel 22 when the driver device is in the bus-controlled operating mode. For example, in one embodiment, the dynamic configuration register 56 loads a dynamic driving configuration received from the digital transmission data bus, wherein the dynamic driving configuration corresponds to a binary state, in which for example the binary value "0" is associated with the "off" state and the binary value "1" is associated with the "on" state, associated with each current controller of the multi-channel current control module 20, when the driver device is in the bus-controlled operating mode.

The control and configuration unit 50 further includes first configuration selection member that transmits 58 to the multichannel current control module 20 the static driving configuration or dynamic driving configuration according to a selection signal 582 indicating the operating mode of the driver device. In one embodiment, the first selection member includes a first configuration multiplexer 58 having an output terminal 584 operatively connected to the multichannel current control module 20, a first input terminal 585 connected to the static configuration register 54, a second input terminal 586 connected to the dynamic configuration register 56, and a selection input terminal 582 on the basis of which the signal on one of said first and second inputs is carried on the output terminal 584.

In one embodiment, the configuration selection member 58 acts to select the driving configuration based on the presence of the digital power supply VDDD in the power supply regulation unit 80.

To prevent the configuration selection member 58 from selecting the dynamic driving configuration in the presence of the digital supply voltage VDDD but in the case of failure of the electronic control unit and therefore the absence of data on the bus, the selection signal 582 comes from an AND gate 59, the inputs of which are a signal indicating the presence of the digital supply voltage VDDD and a signal BDM_Flag which provides information of the receipt of the command to pass to the bus-controlled operating mode by the electronic control unit connected to the transmission data bus.

According to one embodiment, the static driving configuration is the result of the selection, for example by use of a static configuration multiplexer 70, of one of at least two possible static configurations loaded in the respective static configuration registers 54', 54". The selection is performed by a static selection terminal 72, preferably accessible from outside the driver device.

According to one embodiment, the control and configuration unit 50 includes a register of the dynamic current gain suitable to load a gain value BDM_Gain between 0 and 1 received from the digital data transmission bus. The driver device further comprises a module for setting the current gain 90 operatively connected to the setting module of the overall current 30 and suitable to multiply said gain BDM_Gain with the constant current reference ISET when the driver device is in the bus-controlled operating mode.

In another embodiment, the control and configuration unit 50 includes a plurality of dynamic current gain registers, each of which is univocally associated with an output channel 22. Such registers are suitable to load a gain value BDM_Gain_X between 0 and 1 received from the digital transmission data bus. The driver device further comprises a module for setting the current gain 90 operatively connected to the setting module of the overall current 30 and suitable to multiply said gain BDM_Gain_X with the constant current reference ISET when the driver device is in the bus-controlled operating mode.

Returning now to the diagnostic functions, in one embodiment the configuration and control unit 50 further comprises a dynamic register of the fault channel 402 operatively connected to the multichannel current control module 20. The diagnostic module 40 is suitable for writing in said dynamic register of the fault channel 402 a driving configuration for the multichannel current control module 20 in which all the output channels 22 are disabled except the one with the fault.

In one embodiment, which provides for driving the fault output channel with a fault current lower than the constant reference current in order to verify if the fault channel resumes its normal functioning, the driver device further includes a fault current module 100 suitable to provide the multichannel current control module 20 such fault current in place of the reference current ISET. In the presence of a fault, the diagnostic module 40 is operable to control the switching of the power supply of the multichannel current control module from the reference current to the fault current.

As mentioned above, the diagnostic module 40 signals a fault state to the control and configuration unit 50 if at least one of the following situations occurs: short-circuit fault of an LED 12 connected to an output channel 22, open circuit fault of an output channel 22, fault signal 46 from another driver device. For example, signals indicating 420, 422, 46 the three fault situations are reported to the input of an OR gate 404 the output 405 of which is used to indicate a fault state.

In the first two cases of fault, the diagnostic unit 40 writes a driving configuration in the dynamic register of the fault channel 402 for the multichannel current control module 20 in which all the output channels 22 are disabled except for the fault channel; in the third case of fault, the diagnostic unit 40 writes a driving configuration in the dynamic register of the fault channel 402 in which all the output channels 22 are disabled. In this case, in fact, it is desirable for all the driver devices connected to each other and belonging to the same electronic control unit inasmuch as used for the illumination of the same light, for example, the same vehicle light, to deactivate the respective light sources so that said light is completely turned off.

Furthermore, in order to prevent a low power supply voltage VDDA of the light sources being mistaken by the diagnostic module 40 for a short circuit or open circuit fault, the output signal 405 of the OR gate 404 is carried to the input of a first AND gate 406 together with a diagnostic enabling signal 44 which activates when the power supply voltage detected by the diagnostic module is higher than a predetermined threshold value.

In one embodiment, in the bus-driven operating mode, the output of the first AND gate 406 is carried to the input of a second AND gate 408 together with an output signal 411 coming from a third AND gate 410 having in input an SAM/BDM (Stand Alone Mode/Bus Driven Mode) signal, indicating the operating mode of the driver device, and a BDM_Status signal representative of a fault management instruction received from the digital transmission data bus and written for example in a configuration status register in the bus-controlled mode. For example, if an LED fails, and a channel is compromised, but the remaining channels can equally provide the photometry for the intended function, in the bus-controlled operating mode this situation can be managed by ensuring the function with the working channels. Or, if a light is composed of a certain number of right and left light sources, it may be decided that, if a left source fails, the right sources are left activated, or vice versa.

As a result, it is possible in a bus-controlled mode to command the driver device to enable or disable its diagnostics, or to control the multichannel current control module 20 with a desired fault configuration.

In one embodiment, therefore, the output 412 of the diagnostic module 40 which indicates a fault situation is given by a combination OR 404 of the various fault situations, by a subsequent AND combination 406 between the output of the OR gate 404 and the diagnostics enabling signal 42, and by a further AND combination 408 between the output of the first AND gate 406 and a signal 411 taking into account the operating status of the driver device and, in the case of bus-controlled mode, of a fault management instruction provided via the bus.

According to a preferred embodiment, the control and configuration unit 50 comprises second selection member 60 that is operable to transmit to the multichannel current control module 20 one out of a driving configuration selected by the first selection member 58 and a driving configuration present in the dynamic register of the fault channel 402 based on a selection signal 412 generated by the diagnostic module 40 as described above.

For example, the second selection members 60 are also composed of a multiplexer or selector having in input the output of the first selection member, i.e. one out of the static and dynamic driving configurations, and the fault configuration determined by the diagnostic module 40. The selection input of said multiplexer 412 is the output of the diagnostic module 40.

In one embodiment, the control and configuration unit 50 communicates with the multichannel current control module 20 by use of a global activator 110 which receives from the control and configuration unit 50 and transmits the driving configuration of the multichannel current control module 20 in the presence of a global enabling signal 112 coming from the power supply voltage control module 80 and active when the power supply voltage is stabilised.

The driving device according to the invention is thus fitted with circuit blocks suitable to ensure the dual function of providing static and dynamic lighting effects. In a preferred embodiment which provides for the current gain setting module 90 it is possible to set different driving currents, for example to produce an indicator light which lights up gradually with reference to the intensity of the current.

The advantage of having a driver device which can operate both in stand-alone mode and in data bus-controlled mode is dictated by the fact that the same driver device can be utilised with many different control architectures of light sources.

The driver device according to the invention is more versatile than the known devices, and also, in case of a fault of the electronic control unit connected via the data bus the device according to the invention guarantees in any case a basic behaviour without dynamic effects.

The invention also relates to a vehicle light comprising a container body and a lenticular body positioned to close the container body so as to form a housing chamber which houses a plurality of light sources. Such a plurality of light sources is suitable to emit light when supplied with electricity and is intended to pass through the lenticular body. The vehicle light further comprises a driver device configured to drive the plurality of light sources as described above.

A person skilled in the art may make modifications and adaptations to the embodiments of the driver device according to the invention, replacing elements with others functionally equivalent so as to satisfy contingent requirements while remaining within the sphere of protection of the following claims. Each of the characteristics described as belonging to a possible embodiment may be realised independently of the other embodiments described.

The invention claimed is:

1. A driver device of a plurality of light sources, in particular LEDs, wherein said driver device includes:
    a multichannel current control module having a plurality of output channels, each connected to at least one light source, said multichannel current control module operable to set a power supply current on each of said output channels;
    at least one static configuration register operatively connected to said current control module, a static driving configuration being pre-loaded in said static configuration register corresponding to the power supply current value which the multi-channel current control module must set on each output channel when the driver device is in a stand-alone operating mode;
    at least one dynamic configuration register operatively connected to said multichannel current control module, said dynamic configuration register being operable to load a dynamic driving configuration received from a digital data transmission bus connected to an electronic control unit; said dynamic driving configuration corresponding to the power supply current value which the multi-channel current control module must set on each output channel when the driver device is in the bus-controlled operating mode; and
    a first configuration selection member operable to transmit to the multichannel current control module the static driving configuration or dynamic driving configuration according to a selection signal indicating the operating mode of the driver device.

2. The driver device as set forth in claim 1, wherein said first configuration selection member includes a first configuration multiplexer having an output terminal operatively connected to the multichannel current control module, a first input terminal connected to the static configuration register, a second input terminal connected to the dynamic configuration register, and a selection input terminal on the basis of which the signal on one of said first and second inputs is carried on the output terminal.

3. The driver device as set forth in claim 1, further including an analogue power supply circuit (VDDA) for supplying at least the multichannel current control module and a digital power supply circuit (V DDD) for supplying at least the dynamic configuration register, wherein said configuration selection members are operable to select the driving configuration depending on the presence of the digital power supply in the digital power supply circuit.

4. The driver device as set forth in claim 1, further including a setting module of the overall current operable to provide a constant reference current (ISET) for the multi-channel current control module.

5. The driver device as set forth in claim 4, further including a register of the dynamic current gain suitable to load a gain value between 0 and 1 received from the digital transmission data bus and a module for setting the current gain and operable to multiply said gain with said constant reference current when the driver device is in the bus-controlled operating mode.

6. The driver device as set forth in claim 1, further including a diagnostic module operable to detect a short circuit and/or open circuit fault on each of the LEDs connected to the output channels, a fault current module operable to provide the multichannel current control module a constant fault current of lower value than the constant reference current, and a dynamic register of the fault channel operatively connected to the multichannel current control module, said diagnostic module being operable to write in said dynamic register of the fault channel a driving configuration for the multichannel current control module in which all channels are disabled except the fault channel, and being operable to command the switching of the power supply of the multi-channel current control module from the reference current to the fault current.

7. The driver device as set forth in claim 6, further including second selection member operable to the multi-channel current control module one out of a driving configuration selected by the first selection member and a driving configuration present in the dynamic register of the fault channel based on a selection signal generated by the diagnostic module.

8. The driver device as set forth in claim 6, wherein said diagnostic module has an external input indicative of the fault state of at least one other driver device, said diagnostic module being suitable to disable all the output channels of the multichannel current control module in the presence of a fault signal on said external input.

9. The driver device as set forth in claim 6, wherein, in the bus-controlled operating mode, the output of the diagnostic module depends on the presence of a fault on at least one channel or on another driver device and on a fault management instruction received by the digital transmission data bus.

10. A vehicle light comprising;
a container body, a lenticular body placed adjacent to the container body so as to form a housing chamber which houses a plurality of light sources, and a driver device of said light sources, said driver device includes:
a multichannel current control module having a plurality of output channels, each connected to at least one light source, said multichannel current control module operable to set a power supply current on each of said output channels;
at least one static configuration register operatively connected to said current control module, a static driving configuration being pre-loaded in said static configuration register corresponding to the power supply current value which the multi-channel current control module must set on each output channel when the driver device is in a stand-alone operating mode;
at least one dynamic configuration register operatively connected to said multichannel current control module, said dynamic configuration register being operable to load a dynamic driving configuration received from a digital data transmission bus connected to an electronic control unit; said dynamic driving configuration corresponding to the power supply current value which the multi-channel current control module must set on each output channel when the driver device is in the bus-controlled operating mode; and
a first configuration selection member operable to transmit to the multichannel current control module the static driving configuration or dynamic driving configuration according to a selection signal indicating the operating mode of the driver device.

* * * * *